United States Patent
Shiomi et al.

(10) Patent No.: US 11,256,009 B2
(45) Date of Patent: *Feb. 22, 2022

(54) RETROREFLECTIVE SHEET HAVING PARTICLES DISPOSED BETWEEN RETROREFLECTIVE ELEMENTS AND BACK FACE LAYER

(71) Applicant: NIPPON CARBIDE INDUSTRIES CO., INC., Tokyo (JP)

(72) Inventors: Toshiaki Shiomi, Toyama (JP); Chenyang Jiang, Toyama (JP)

(73) Assignee: NIPPON CARBIDE INDUSTRIES CO., INC., Tokyo (JP)

( * ) Notice: Subject to any disclaimer, the term of this patent is extended or adjusted under 35 U.S.C. 154(b) by 42 days.

This patent is subject to a terminal disclaimer.

(21) Appl. No.: 16/754,393

(22) PCT Filed: Oct. 4, 2018

(86) PCT No.: PCT/JP2018/037143
§ 371 (c)(1),
(2) Date: Apr. 8, 2020

(87) PCT Pub. No.: WO2019/073888
PCT Pub. Date: Apr. 18, 2019

(65) Prior Publication Data
US 2020/0310009 A1    Oct. 1, 2020

(30) Foreign Application Priority Data
Oct. 12, 2017    (JP) .............................. JP2017-198716

(51) Int. Cl.
*G02B 5/124* (2006.01)
*G02B 1/14* (2015.01)

(52) U.S. Cl.
CPC ............... *G02B 5/124* (2013.01); *G02B 1/14* (2015.01)

(58) Field of Classification Search
None
See application file for complete search history.

(56) References Cited

U.S. PATENT DOCUMENTS 5,272,562 A * 12/1993 Coderre ................. G02B 5/124
359/529
5,656,360 A * 8/1997 Faykish ................. G02B 5/128
428/195.1
(Continued)

FOREIGN PATENT DOCUMENTS

CN    204422797 U    6/2015
EP    2390688 A1    11/2011
(Continued)

*Primary Examiner* — Jennifer D. Carruth
(74) *Attorney, Agent, or Firm* — Venable LLP

(57) ABSTRACT

A retroreflective sheet includes: a retroreflective layer (20) including a plurality of retroreflective elements (24) on one surface; a back face layer (40) provided to face the surface of the retroreflective layer (20) on the side of the retroreflective elements (24) and including a bonding portion (42) bonded to the retroreflective elements (24); and a plurality of particles (30) disposed between the retroreflective elements (24) and the back face layer (40). The bonding portion (42) is continuously formed to surround a plurality of capsule portions (46) in plan view. Voids (32) are formed between the retroreflective elements (24) and the back face layer (40) in the plurality of capsule portions (46).

21 Claims, 2 Drawing Sheets

(56) References Cited

U.S. PATENT DOCUMENTS

| | | | | |
|---|---|---|---|---|
| 5,754,338 A | * | 5/1998 | Wilson | B29C 65/608 |
| | | | | 359/530 |
| 2001/0017731 A1 | * | 8/2001 | Smith | G02B 5/124 |
| | | | | 359/530 |
| 2012/0300166 A1 | | 11/2012 | Jiang | |
| 2020/0241179 A1 | * | 7/2020 | Shiomi | B32B 37/10 |

FOREIGN PATENT DOCUMENTS

| | | |
|---|---|---|
| EP | 3451030 A1 | 3/2019 |
| GB | 870325 A | 6/1961 |
| JP | H06-347621 | 12/1994 |
| JP | 2000-506623 A | 5/2000 |
| WO | 2007/010945 | 1/2007 |
| WO | 2012/029921 | 3/2012 |
| WO | 2017/188243 | 11/2017 |

* cited by examiner

RETROREFLECTIVE SHEET HAVING PARTICLES DISPOSED BETWEEN RETROREFLECTIVE ELEMENTS AND BACK FACE LAYER

TECHNICAL FIELD

This application is a national stage of PCT application No. PCT/JP2018/037143 filed Oct. 4, 2018, which in turn claims priority of Japanese Patent Application No. 2017-198716 filed Oct. 12, 2017, the contents of which are incorporated herein by reference.

The present invention relates to a retroreflective sheet.

BACKGROUND ART

The retroreflective sheet has a property of allowing light incident thereon to be reflected toward a light source. Due to such a property, the retroreflective sheet is used for a purpose such as raising visibility of a target object (such as a printed object) irradiated with light during nighttime or in a dark place. The retroreflective sheet is used for, for example, traffic signs, guide signs, vehicle license plates, advertisement signs, traffic lane separators, delineators, and the like.

An example of such a retro reflective sheet is disclosed in Patent Literature 1 described below. The retroreflective sheet includes: a light transmissive layer including retroreflective elements; and a resin back face layer provided with multiple dents smaller than the retroreflective elements, on a surface facing a surface of the light transmissive layer on which the retroreflective elements are formed. In this retroreflective sheet, low refractive index gas is confined in voids formed between the dents formed in the resin back face layer and the retroreflective elements. With a refractive index difference between the low refractive index gas and the retroreflective elements, light being incident from the light transmissive layer and having reached the interface between the retroreflective elements and the voids, can be reflected toward the light transmissive layer.

[Patent Literature 1] Japanese Patent No. 3123693

SUMMARY OF INVENTION

A retroreflective sheet described in Patent Literature 1 described above has no metal vapor-deposited film used therein, and thus can have improved brightness. The retroreflective sheet having excellent brightness can be used for a printed object, such as a vehicle license plate, to enable a printed part to stand out. However, in the retroreflective sheet disclosed in Patent Literature 1 described above, the voids formed between the retroreflective elements and the dents might be crushed due to application of pressure in a thickness direction as a result of bending or embossing. When the voids are thus crushed, the retroreflectivity decreases. Therefore, the retroreflective sheet disclosed in Patent Literature 1 described above might have the retroreflectivity compromised when it is used for a printed object bent or embossed, compared with a case where it is used for a flat object.

In view of this, an object of the present invention is to provide a retroreflective sheet in which a decrease in the retroreflectivity is less likely to be compromised even when the pressure in the thickness direction is applied.

In order to solve the above problems, a retroreflective sheet according to the present invention includes: a retroreflective layer including a plurality of retroreflective elements on one surface; a back face layer provided to face the surface of the retroreflective layer on the side of the retroreflective elements and including a bonding portion bonded to the retroreflective elements; and a plurality of particles disposed between the retroreflective elements and the back face layer. The bonding portion is continuously formed to surround a plurality of capsule portions in plan view. Voids are formed between the retroreflective elements and the back face layer in the plurality of capsule portions.

In the above-described retroreflective sheet, the plurality of particles is fixed by being sandwiched by the retroreflective elements and the back face layer. Furthermore, the voids are formed between the retroreflective elements and the back face layer, and a gas such as air is confined in the voids. Due to the refractive index difference between this gas and the retroreflective elements, the light incident from the retroreflective layer side can be reflected to the retroreflective layer side at an interface between the retroreflective elements and the voids. Furthermore, in the above-described retroreflective sheet, the voids between the retroreflective elements and the back face layer are supported by the plurality of particles and thus can be prevented from being crushed even when pressure in the thickness direction is applied. Furthermore, in the above-described retroreflective sheet, the bonding portion, where the retroreflective elements and the back face layer are bonded to each other, is continuously formed to surround the plurality of capsule portions, and thus the bonding portion supports the voids when the pressure in the thickness direction is applied, whereby the voids in the plurality of capsule portions can be less likely to be crushed. Therefore, in the above-described retroreflective sheet, a decrease in retroreflectivity can be suppressed even when pressure is applied in the thickness direction.

Furthermore, in the above-described retroreflective sheet, the bonding portion where the retroreflective elements and the back face layer are bonded to each other is continuously formed to surround the plurality of capsule portions, and thus can prevent water or foreign matter from entering the plurality of capsule portions when the retroreflective sheet is used in an environment (such as outdoors) exposed to water or foreign matter. Thus, in the capsule portions, the voids can be prevented from being filled with water or foreign matter. For this reason, the above-described retroreflective sheet can have improved reliability when used in an environment (such as outdoors) exposed to water or foreign matter.

Moreover, the plurality of particles is preferably disposed in the bonding portion.

With the plurality of particles also disposed in the bonding portion, the brightness difference between the bonding portion and the capsule portions in plan view of the retroreflective sheet can be reduced.

Alternatively, the plurality of particles is preferably not disposed in the bonding portion.

With no particles disposed in the bonding portion, the bonding area of the retroreflective elements and the back face layer increases, whereby increased bonding strength between the retroreflective elements and the back face layer can be achieved.

Furthermore, in the plurality of capsule portions, a part of the back face layer and a part of the retroreflective elements are preferably bonded to each other.

In plan view, the portions where the retroreflective elements are bonded to the back face layer appear to be brighter than the portions where the retroreflective elements come into contact with the voids. Therefore, the bonding portion looks brighter than the capsule portions where the voids are formed. In view of this, the back face layer and the retroreflective elements are partially bonded to each other also in the capsule portions as described above, whereby the brightness difference between the bonding portion and the capsule portions may be reduced. Thus, the uniformity of the appearance of the retroreflective sheet can be improved. Furthermore, the bonding strength between the retroreflective elements and the back face layer can be increased by increasing bonding portions between the back face layer and the retroreflective elements.

Furthermore, in plan view, a width w1 of the bonding portion is preferably 1000 μm or less, and a ratio w1/w2 of the width w1 of the bonding portion to a width w2 of the capsule portions is preferably 0.7 or more and 1.4 or less.

The brightness difference between the bonding portion and the capsule portion can further be reduced by reducing the width w1 of the bonding portion and reducing a difference between the width w1 of the bonding portion and the width w2 of the capsule portion surrounded by the bonding portion to a certain level.

The plurality of particles is preferably colored with a color similar to a color of the back face layer.

With the particles having a color that is similar to the that of the back face layer, the difference between the color of the back face layer and the color of the particles is less likely to be noticeable in plan view, whereby uniformity of the appearance of the retroreflective sheet can be improved.

The refractive index of the plurality of particles is preferably smaller than the refractive index of the retroreflective elements.

When the refractive index of the particles is smaller than the refractive index of the retroreflective elements, reflection of the light incident from the retroreflective elements side toward the retroreflective elements in the interface between the retroreflective elements and the particles is facilitated at the portions where the retroreflective elements and the particles are in contact with each other. Thus, the retroreflectivity of the retroreflective sheet can be further improved.

Furthermore, an average particle diameter da of the plurality of particles may be set to equal to or larger than a height h of the retroreflective elements.

When the average particle diameter da of the plurality of particles is equal to or larger than the height h of the retroreflective elements, formation of the voids between the retroreflective elements and the plurality of particles is facilitated, whereby the retroreflectivity of the retroreflective sheet can be increased.

Furthermore, in the above-described retroreflective sheet, the average particle diameter da of the plurality of particles may be set to smaller than the height h of the retroreflective elements.

When the average particle diameter da of the plurality of particles is smaller than the height h of the retroreflective elements, it becomes easy to increase the area of the bonding portion between the retroreflective elements and the back face layer, whereby the bonding strength between the retroreflective elements and the back face layer can be increased.

Furthermore, in the above-described retroreflective sheet, a ratio da/h of the average particle diameter da of the plurality of particles to the height h of the retroreflective elements is preferably equal to or higher than 0.40 and equal to or lower than 1.25.

In the present invention, the "average particle diameter" means particle diameters measured as follows. First, cross-sectional photographs are taken using a microscope (VHX-1000, manufactured by Keyence Corporation) at any 10 cross sections of the retroreflective sheet. Next, the particle diameters of 100 particles in the 10 cross-sectional photographs are measured, and the average value is calculated by dividing the total length by 100, and this average value is taken as the average particle diameter.

When the ratio da/h of the average particle diameter da of the plurality of particles to the height h of the retroreflective elements is equal to or higher than 0.40 and equal to or lower than 1.25, the voids with an appropriate size are formed between the retroreflective elements and the plurality of particles, whereby the retroreflectivity of the retroreflective sheet can be increased. Furthermore, with the ratio da/h being equal to or larger than 0.40 and equal to or smaller than 1.25, it becomes easy to increase the area of the bonding portion between the retroreflective elements and the back face layer, whereby the bonding strength between the retroreflective elements and the back face layer can be increased.

Furthermore, in the above-described retroreflective sheet, a ratio np/nv of the number np of the plurality of particles to the number nv of valleys formed between the adjacent retroreflective elements is preferably equal to or higher than 0.50 and equal to or lower than 5.00.

When the ratio np/nv of the number np of the plurality of particles to the number nv of valleys formed between the adjacent retroreflective elements is equal to or larger than 0.50 and equal to or smaller than 5.00, the voids with an appropriate size are formed between the retroreflective elements and the plurality of particles, whereby the retroreflectivity of the retroreflective sheet can be increased. Furthermore, with the ratio np/nv being equal to or larger than 0.50 and equal to or smaller than 5.00, it becomes easy to increase the area of the bonding portion between the retroreflective elements and the back face layer, whereby the bonding strength between the retroreflective elements and the back face layer can be increased.

Moreover, in the above-described retroreflective sheet, the plurality of particles is preferably spherical.

When the plurality of particles is spherical, it becomes easy to form the voids with an appropriate size between the retroreflective elements and the plurality of particles, whereby the retroreflectivity of the retroreflective sheet can be increased.

As described above, according to the present invention, a retroreflective sheet in which a decrease in the retroreflectivity is less likely to be compromised even when the pressure in the thickness direction is applied is provided.

DESCRIPTION OF EMBODIMENTS

Hereinafter, a preferred embodiment of a retroreflective sheet according to the present invention will be described in detail with reference to the drawings.

Figure 1:
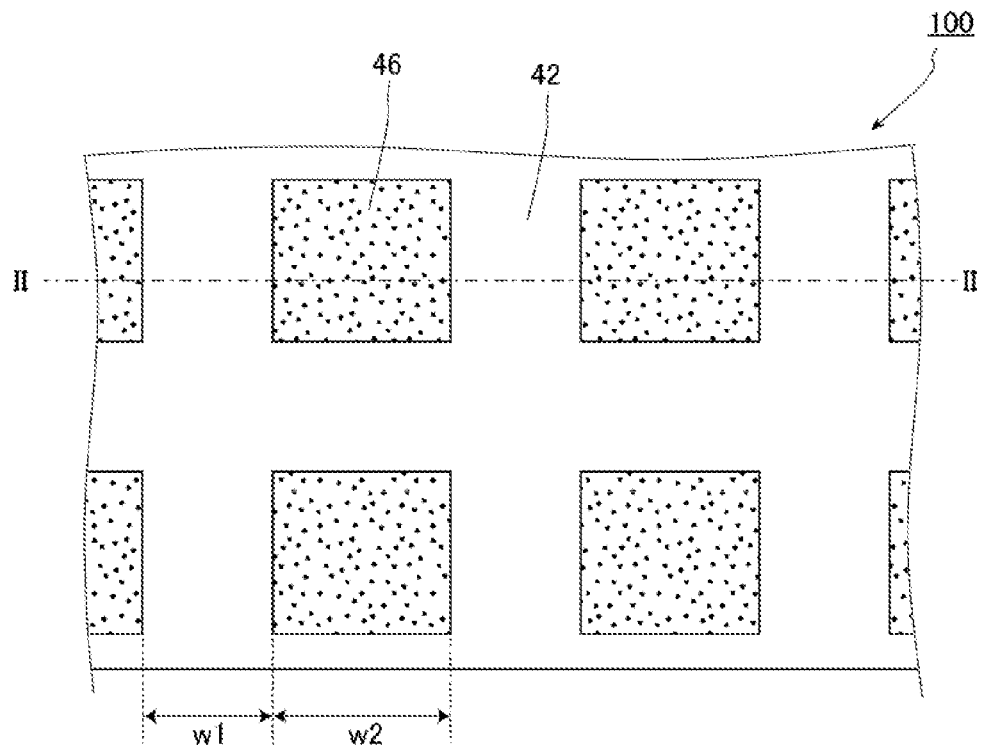
FIG. 1 is a schematic plan view illustrating a part of a retroreflective sheet according to an embodiment of the present invention.
Figure 2:
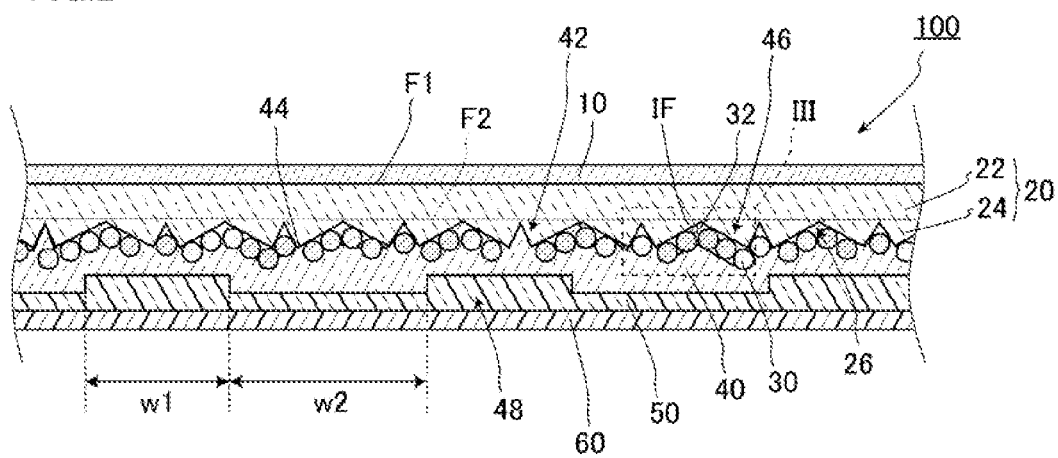
FIG. 2 is a schematic cross sectional view of the retroreflective sheet illustrated in FIG. 1 in a thickness direction, taken along line II-II.

FIG. 1 is a schematic plan view illustrating a retroreflective sheet according to an embodiment. FIG. 2 is a schematic cross sectional view of the retroreflective sheet illustrated in FIG. 1 in a thickness direction, taken along line II-II. In each of FIGS. 1 and 2 and other drawings referred to in the following description, the size of each component is illustrated in an exaggerated manner or the like, and thus is not accurately illustrated for the sake of easy understanding. Furthermore, in each of FIGS. 1 and 2 and other drawings referred to in the following description, the same reference numerals are given to components having the same configuration, and repeated reference numerals are omitted.

As illustrated in FIG. 2, the retroreflective sheet 100 according to the present embodiment includes a surface protective layer 10, a retroreflective layer 20, a plurality of particles 30, a back face layer 40, an adhesive layer 50, and a release layer 60. Hereinafter, these components included in the retroreflective sheet 100 will be described in more detail.

The surface protective layer 10 is a layer that protects a surface F1 of the retroreflective layer 20 disposed on a viewer side when the retroreflective sheet 100 is used, and is the layer on the outermost side of the retroreflective sheet 100 when the retroreflective sheet 100 is used. For the sake of providing the retroreflective sheet 100 with excellent retroreflectivity, the surface protective layer 10 is preferably a transparent resin layer. The total light transmittance of the surface protective layer 10 is, for example, 80% or more. Examples of the material forming the surface protective layer 10 include acrylic resin, alkyd resin, fluorine resin, vinyl chloride resin, polyester resin, urethane resin, and polycarbonate resin. One of these types of resin may be used alone, or a plurality of these types may be used in combination. For the sake of providing the surface protective layer 10 with weatherability and workability, acrylic resin, polyester resin, and vinyl chloride resin are preferably used. Furthermore, acrylic resin is preferably used for the sake of coating ability, dispersibility of a colorant when coloring, and the like. Note that various additives may be added to the surface protective layer 10 without largely compromising the transparency. The additives include an ultraviolet absorber, a light stabilizer, a heat stabilizer, a plasticizer, a crosslinking agent, an antioxidant, an antifungal agent, a colorant, and the like.

The retroreflective layer 20 includes a plate-shaped holding body portion 22 and a plurality of retroreflective elements 24. A first surface F1 of the holding body portion 22 is covered with the surface protective layer 10, and a second surface F2 of the holding body portion 22 is provided with a plurality of retroreflective elements 24. The plurality of retroreflective elements 24 is not particularly limited as long as they have a reflective surface suitable for retroreflecting incident light. For example, preferably, the retroreflective elements 24 with a polyhedral shape such as a triangular pyramid or what is known as a cube corner shape are arranged in a close-packed manner, so that excellent retroreflectivity can be achieved.

For the sake of providing the retroreflective sheet 100 with excellent retroreflectivity, the retroreflective layer 20 is preferably a transparent resin layer. Examples of the material forming the retroreflective layer 20 include acrylic resin, urethane resin, fluorine resin, polyester resin, vinyl chloride resin, polycarbonate resin, polyarylate resin, silicone resin, polyolefin resin, and ionomer resin. One of these types of resin may be used alone, or a plurality of these types may be used in combination. Furthermore, for the sake of improving the transparency and weatherability of the retroreflective layer 20, the retroreflective layer 20 is preferably made of acrylic resin, urethane resin, fluorine resin, polycarbonate resin, or the like. Note that various additives may be added to the retroreflective layer 20 without largely compromising the transparency. The additives include an ultraviolet absorber, a light stabilizer, a heat stabilizer, a plasticizer, a crosslinking agent, an antioxidant, an antifungal agent, a colorant, and the like.

The back face layer 40 is a layer provided to face the surface of the retroreflective layer 20 on the side of the retroreflective elements 24, and including a bonding portion 42 bonded to the retroreflective elements 24. As illustrated in FIG. 1, the bonding portion 42 is continuously formed to surround a plurality of capsule portions 46 in plan view. Furthermore, in the retroreflective sheet 100 according to the present embodiment, as illustrated in FIG. 2, the plurality of capsule portions 46 is provided with partial bonding portions 44 where a part of the back face layer 40 and a part of the retroreflective elements 24 are bonded to each other. In plan view, the bonding portion 42 has a predetermined width and is continuously formed so as to surround the capsule portions 46, whereas the partial bonding portions 44 are intermittently formed.

In plan view, the bonding portion 42 preferably has a width w1 that is 1000 μm or less. A ratio w1/w2 of the width w1 of the bonding portion 42 to a width w2 of the capsule portion 46 is preferably 0.7 or more and 1.4 or less. The brightness difference between the bonding portion 42 and the capsule portion 46 can be reduced by reducing the width w1 of the bonding portion 42. The brightness difference between the bonding portion 42 and the capsule portion 46 can further be reduced by reducing a difference between the width w1 of the bonding portion 42 and the width w2 of the capsule portion 46 surrounded by the bonding portion 42 to a certain level.

Furthermore, a surface of the back face layer 40 according to the present embodiment opposite to the side of the retroreflective layer 20 is provided with recesses 48 that are recessed toward the retroreflective layer 20 and are positioned to overlap with the bonding portion 42 in the thickness direction of the retroreflective sheet 100. The recesses 48 are portions formed when the back face layer 40 is pressed in a process of manufacturing the retroreflective sheet 100 as described later.

Examples of the material forming such a back face layer 40 include acrylic resin, urethane resin, fluorine resin, polyester resin, vinyl chloride resin, polycarbonate resin, polyarylate resin, silicone resin, polyolefin resin, and ionomer resin. One of these types of resin may be used alone, or a plurality of these types may be used in combination. Furthermore, for the sake of improving the transparency and weatherability of the back face layer 40, the back face layer 40 is preferably made of acrylic resin, urethane resin, fluorine resin, polycarbonate resin, or the like. Note that various additives may be added to the back face layer 40. The additives include an ultraviolet absorber, a light stabilizer, a heat stabilizer, a plasticizer, a crosslinking agent, an antioxidant, an antifungal agent, a colorant, and the like.

The brightness and saturation of the retroreflective sheet 100 can be easily improved by providing a certain pigment in the back face layer 40. For example, the brightness of the retroreflective sheet 100 can be improved by providing a white pigment such as titanium oxide in the back face layer 40.

Furthermore, the back face layer 40 may contain a colorant other than the white pigment such as titanium oxide described above. Examples of such a colorant to be used may include inorganic pigments, organic pigments, organic dyes, and pearl pigments. In the back face layer 40, one of these colorants may be used alone, or two or more of these may be used in combination.

Examples of the inorganic pigments described above other than titanium oxide include calcium carbonate, barium sulfate, zinc oxide, zinc sulfide, carbon black, cadmium red, molybdenum red, ultramarine, cobalt blue, red iron oxide, chromium oxide, iron black, cadmium yellow, titanium yellow, nickel titanium yellow, chrome titanium yellow, yellow lead, yellow iron oxide, chrome orange, cadmium orange, gold powder, silver powder, copper powder, aluminum powder, and bronze powder. Examples of the organic pigments and the organic dyes include anthraquinone, phthalocyanine, quinacridone, isoindolinone, dioxazine, quinophthalone, quinoimine, perylene, perinone, azo, quinoline, methine, indigo, and naphtholimide organic compounds. Examples of the pearl pigments include titanium oxide-coated mica, bismuth oxide chloride, fish scales, and basic lead carbonate.

Conventionally, a retroreflective sheet has been colored by adding a colorant to the retroreflective layer, or by providing a printed or colored layer on a light incident side surface of the retroreflective layer. Retroreflectivity of such a conventional retroreflective sheet could have deteriorated because the colorant or the printed layer scatters light or inhibits incidence of light onto the retroreflective layer to inhibit reflection of light on the retroreflective layer. Colorants with dark colors (such as red, blue, and green) are especially likely to involve such a negative effect. On the other hand, for example, the retroreflective sheet 100 according to the present embodiment has the transparent retroreflective layer 20, and involves fewer factors hindering the incidence and reflection of light on the retroreflective layer 20 in a case where the colorant is added to the back face layer 40 as described above compared with the conventional configuration, whereby a decrease in the retroreflectivity is less likely to be compromised.

Figure 3:
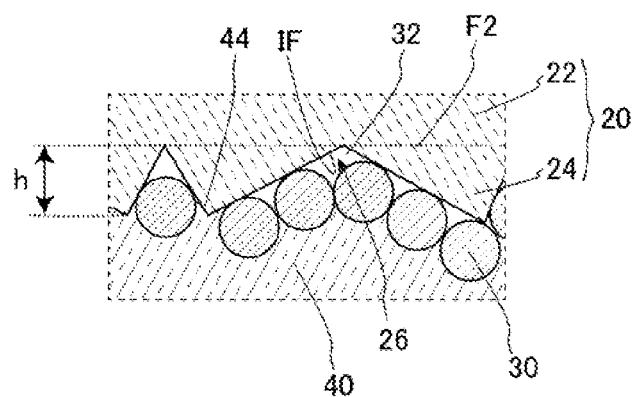
FIG. 3 is an enlarged view of the part of the retroreflective sheet illustrated in FIG. 2.

The plurality of particles 30 is disposed between the retroreflective elements 24 and the back face layer 40 while being in contact with the retroreflective elements 24 and the back face layer 40 as illustrated in FIG. 2. In the bonding portion 42, the plurality of particles 30 is surrounded by the retroreflective elements 24 or the back face layer 40. Therefore, the formation of voids between the retroreflective elements 24 and the back face layer 40 or the plurality of particles 30 is suppressed. FIG. 3 is an enlarged view of a portion III surrounded by the broken line (a part of the capsule portions 46) of the retroreflective sheet illustrated in FIG. 2. In the capsule portions 46, the plurality of particles 30 is arranged between the retroreflective elements 24 and the back face layer 40. Thus, the plurality of particles 30 is sandwiched by the retroreflective elements 24 and the back face layer 40 to have their positions fixed. With the plurality of particles 30 thus sandwiched by the retroreflective elements 24 and the back face layer 40, voids 32 are formed between the back face layer 40 and the retroreflective elements 24. In a part of the capsule portions 46 according to the present embodiment, the partial bonding portions 44 are formed with a part of the retroreflective elements 24 and a part of the back face layer 40 bonded to each other.

The shape, the size, and the number of the particles 30 are not particularly limited as long as the voids 32 can be formed between the plurality of particles 30 and the retroreflective elements 24 in the capsule portions 46.

As such particles 30, for example, glass beads can be used. From the viewpoint of facilitating dispersion of the plurality of particles 30 at a uniform interval between the retroreflective elements 24 and the back face layer 40, the particles 30 are preferably glass beads, which are difficult to be charged. Furthermore, as particles other than glass beads that can be used as the particles 30, ceramic particles including talc, titanium oxide, calcium carbonate, silica, barium sulfate, mica, wollastonite, and resin particles including acrylic resin, epoxy resin, polyimide resin, PPS (polyphenylene sulfide) resin, silicone resin, melamine resin, fluorine resin, and the like can be used.

The particles 30 may be colored. By coloring the particles 30, the brightness and saturation of the retroreflective sheet 100 can be improved. When the particles 30 are colored, the particles 30 are preferably colored with a color similar to a color of the back face layer 40. For example, when the back face layer 40 is colored white, the color of the particles 30 is preferably white or milky white. With the particles 30 thus having a color that is similar to the that of the back face layer 40, the difference between the color of the back face layer 40 and the color of the particles 30 is less likely to be noticeable in plan view, whereby uniformity of the appearance of the retroreflective sheet 100 can be improved.

The particles 30 are also preferably colorless and transparent. The particles 30 that are colorless and transparent are less noticeable regardless of the color of the back face layer 40, meaning that the appearance of the retroreflective sheet 100 can be improved.

Furthermore, the particles 30 may be hollow particles. The term "hollow particles" refers to particles with a cavity formed inside the outer shell. In addition, the inside of this cavity may be a vacuum or may be filled with gas.

The adhesive layer 50 is provided on the side of the back face layer 40 opposite to the side of the retroreflective layer 20, and serves as a layer that is attached to an adherend when the retroreflective sheet 100 is used.

The material forming the adhesive layer 50 can be appropriately selected from, for example, a pressure-sensitive adhesive, a heat-sensitive adhesive, a cross-linked adhesive, and the like. Examples of the pressure-sensitive adhesive include a polyacrylic acid ester pressure-sensitive adhesive obtained by copolymerizing acrylic acid ester such as butyl acrylate, 2-ethylhexyl acrylate, isooctyl acrylate, or nonyl acrylate with acrylic acid, vinyl acetate, or the like, a silicone-based resin pressure-sensitive adhesive, and a rubber-based pressure-sensitive adhesive. Examples of the heat-sensitive adhesive include acrylic resin, polyester resin, and epoxy resin. Acrylic resin or silicone resin is preferably used, so that the adhesive layer 50 can have excellent weatherability and adhesiveness.

The brightness and saturation of the retroreflective sheet 100 can be easily improved in accordance with how the retroreflective sheet 100 is to be used, by providing a certain pigment in the adhesive layer 50. For example, the brightness of the retroreflective sheet 100 can be improved by providing a white pigment such as titanium oxide in the adhesive layer 50.

The release layer 60 is a layer provided on the side of the adhesive layer 50 opposite to the side of the back face layer 40. By covering the adhesive layer 50 with the release layer 60 before the retroreflective sheet 100 is used, dust or the like is prevented from adhering to the adhesive layer 50 or the adhesive layer 50 is prevented from adhering to an unintended place. On the other hand, when the retroreflective sheet 100 is used, the release layer 60 is peeled from the adhesive layer 50.

Such a release layer 60 is made of, for example, a polyester film, a polypropylene film, or the like, but is not particularly limited thereto.

The retroreflective sheet 100 described above can be manufactured as exemplified below. First of all, the back face layer 40 is prepared, and the plurality of particles 30 is dispersedly arranged on the surface of the back face layer 40 in a state where the back face layer 40 has viscosity. Then, the surface of the back face layer 40 on which the plurality of particles 30 is arranged is overlapped on the retroreflective layer 20, and the retroreflective elements 24 and the back face layer 40 are bonded to each other. At this time, the retroreflective layer 20 is placed on a flat surface in a state where the retroreflective elements 24 and the back face layer 40 are overlapped with each other, and the back face layer 40 is pressed onto the retroreflective layer 20 under application of heat. As a result, the recesses 48 are formed in the back face layer 40, and the back face layer 40 and the retroreflective elements 24 are thermocompression-bonded to each other on the surface of the back face layer 40 opposite to the recesses 48. In this way, the bonding portion 42 is formed. In the present embodiment, the pressing of the back face layer 40 as described above is performed by using a grid-shaped pressing member, whereby the bonding portion 42 having a grid shape is formed as illustrated in FIG. 1. In addition, when the pressing as described above is performed, the back face layer 40 is somewhat pressed onto the retroreflective layer 20 also in portions to be the capsule portions 46. Thus, the partial bonding portions 44 are formed. After the retroreflective layer 20 and the back face layer 40 are bonded in this manner, the adhesive layer 50 and the release layer 60 are stacked. The surface protective layer 10 may be formed before the retroreflective layer 20 and the back face layer are overlapped, or may be formed after the retroreflective layer 20 and the back face layer 40 are overlapped. Moreover, the method for forming each layer is not specifically limited.

By performing the pressing from the back face layer 40 side to thermocompression-bond the retroreflective layer 20 and the back face layer 40 to each other as described above, deformation of the retroreflective layer 20 is less likely to occur, meaning that a negative impact on the retroreflectivity of the retroreflective sheet 100 may be reduced.

However, the method for manufacturing the retroreflective sheet 100 is not limited to the above method. The retroreflective sheet 100 can also be manufactured by dispersing and arranging the plurality of particles 30 on the surface of the retroreflective layer 20 on which the retroreflective elements 24 are formed, thereafter overlaying the back face layer 40, forming the bonding portion 42 and stacking the other layers in the same manner as in the above method.

The retroreflective sheet 100 described above includes the retroreflective layer 20, the back face layer 40, the plurality of particles 30, and the voids 32. In plan view, the bonding portion 42 where the retroreflective layer 20 and the back face layer 40 are bonded to each other is continuously formed to surround the plurality of capsule portions 46 in plan view. In such a retroreflective sheet 100 according to the present embodiment, the plurality of particles 30 is fixed by being sandwiched by the retroreflective elements 24 and the back face layer 40. Furthermore, the voids 32 are formed between the back face layer 40 and the retroreflective elements 24, and a gas such as air is confined in the voids 32. Due to the refractive index difference between this gas and the retroreflective elements 24, the light incident from the retroreflective layer 20 side can be reflected to the retroreflective layer 20 side at an interface IF between the retroreflective elements 24 and the voids 32. Furthermore, in the retroreflective sheet 100 according to the present embodiment, the voids 32 between the retroreflective elements 24 and the back face layer 40 are supported by the plurality of particles 30 and thus can be prevented from being crushed even when pressure is applied in the thickness direction. Furthermore, in the retroreflective sheet 100 according to the present embodiment, the bonding portion 42, where the retroreflective elements 24 and the back face layer 40 are bonded to each other, is continuously formed to surround the plurality of capsule portions 46, and thus the bonding portion 42 supports the voids 32 when the pressure in the thickness direction is applied, whereby the voids 32 in the plurality of capsule portions 46 are less likely to be crushed. Therefore, in the retroreflective sheet 100 according to the present embodiment, a decrease in the retroreflectivity can be less likely to be compromised even when pressure is applied in the thickness direction as described above.

Furthermore, as described above, in the retroreflective sheet 100 according to the present embodiment, the bonding portion 42 where the retroreflective elements 24 and the back face layer 40 are bonded to each other is continuously formed so as to surround the plurality of capsule portions 46. For this reason, water or foreign matter can be prevented from entering the plurality of capsule portions 46 when the retroreflective sheet is used in an environment (such as outdoors) exposed to water or foreign matter. Thus, in the capsule portions 46, the voids 32 can be prevented from being filled with water or foreign matter. For this reason, the retroreflective sheet 100 according to the present embodiment can have improved reliability when used in an environment (such as outdoors) exposed to water or foreign matter.

Furthermore, in the retroreflective sheet 100 according to the present embodiment, the plurality of particles 30 is disposed in the plurality of capsule portions 46 and the bonding portion 42. With the plurality of particles 30 also disposed in the bonding portion 42 and in the capsule portions 46 surrounded by the bonding portion 42, the brightness difference between the bonding portion 42 and the capsule portions 46 in plan view of the retroreflective sheet 100 can be reduced.

Furthermore, in the retroreflective sheet 100 according to the present embodiment, in the plurality of capsule portions 46, a part of the back face layer 40 and a part of the retroreflective elements 24 are bonded to each other. In plan view, the portions where the back face layer 40 and the retroreflective elements 24 are bonded to each other appear to be brighter than the portions where the voids 32 are formed between the back face layer 40 and the retroreflective elements 24. This results in a brightness difference between the portions where the back face layer 40 and the retroreflective elements 24 are bonded to each other and the portions where the voids 32 are formed between the back face layer 40 and the retroreflective elements 24. In view of this, the back face layer 40 and the retroreflective elements 24 are partially bonded to each other also in the capsule portions 46 surrounded by the bonding portion 42 as described above, whereby the brightness difference between the bonding portion 42 and the capsule portions 46 may be reduced. Thus, the uniformity of the appearance of the retroreflective sheet 100 can be improved. Furthermore, the bonding strength between the retroreflective elements and the back face layer 40 can be increased by increasing bonding portions between the back face layer 40 and the retroreflective elements 24.

Furthermore, in the retroreflective sheet 100, the size, the shape, and the number of the plurality of particles 30 are adjusted for forming the voids 32 contributing to the retroreflection by the plurality of particles 30. Thus, the size and the distribution of the voids 32 can be easily adjusted over the entire retroreflective sheet 100. Specifically, in the retroreflective sheet 100, it is easy to increase the uniformity of the retroreflectivity to be close to complete uniformity over the entire retroreflective sheet 100, or to adjust the level of the retroreflectivity of the retroreflective sheet 100.

When an average particle diameter da of the plurality of particles 30 is equal to or larger than a height h of the retroreflective elements 24, formation of the voids 32 between the retroreflective elements 24 and the plurality of particles 30 is facilitated, whereby the retroreflectivity of the retroreflective sheet 100 can be easily increased. On the other hand, when the average particle diameter da of the plurality of particles 30 is smaller than the height h of the retroreflective elements 24, it becomes easy to increase the area of the bonding portion 42 between the retroreflective elements 24 and the back face layer 40, whereby the bonding strength between the retroreflective elements 24 and the back face layer 40 can be easily increased. When a ratio da/h of the average particle diameter da of the plurality of particles 30 to the height h of the retroreflective elements 24 is equal to or higher than 0.40 and equal to or lower than 1.25, the voids 32 with an appropriate size are formed between the retroreflective elements 24 and the plurality of particles 30, whereby the retroreflectivity of the retroreflective sheet 100 can be easily increased. At the same time, it becomes easy to increase the area of the bonding portion 42 between the retroreflective elements 24 and the back face layer 40, whereby the bonding strength between the retroreflective elements 24 and the back face layer 40 can be easily increased.

When a ratio np/nv of the number np of the plurality of particles 30 to the number nv of valleys 26 formed between the adjacent retroreflective elements 24 is equal to or larger than 0.50 and equal to or smaller than 5.00, the voids 32 with an appropriate size are formed between the retroreflective elements 24 and the plurality of particles 30, whereby the retroreflectivity of the retroreflective sheet 100 can be easily increased. Furthermore, with the ratio np/nv being equal to or larger than 0.50 and equal to or smaller than 5.00, it becomes easy to increase the area of the bonding portion 42 between the retroreflective elements 24 and the back face layer 40, whereby the bonding strength between the retroreflective elements 24 and the back face layer 40 can be easily increased. In view of these, the ratio np/nv is more preferably equal to or larger than 0.50 and equal to or smaller than 2.00.

When the plurality of particles 30 is spherical, it becomes easy to form the voids 32 with an appropriate size between the retroreflective elements 24 and the plurality of particles 30, whereby the retroreflectivity of the retroreflective sheet 100 can be easily increased.

Furthermore, when the particles 30 are hollow particles as described above, not only the voids 32 are formed between the retroreflective elements 24 and the plurality of particles 30 but also the particles 30 themselves have cavities with a lower refractive index than the retroreflective elements 24. Thus, the volume of the space having a lower refractive index than the retroreflective elements 24 can be increased between the retroreflective elements 24 and the back face layer 40. As a result, the retroreflectivity of the retroreflective sheet 100 can be further improved.

Furthermore, for the sake of efficient retroreflection at the retroreflective elements 24, the refractive index of the material forming the retroreflective elements 24 is preferably larger than the refractive index of the material forming the back face layer 40. When the refractive index of the material forming the retroreflective elements 24 is larger than the refractive index of the material forming the back face layer 40, light can be reflected also at the bonding portion 42. For the sake of achieving a similar effect, the refractive index of the plurality of particles 30 is preferably smaller than the refractive index of the retroreflective elements 24. When the refractive index of the particles 30 is smaller than the refractive index of the retroreflective elements 24, reflection of the light incident from the retroreflective elements 24 side toward the retroreflective elements 24 in the interface between the retroreflective elements 24 and the particles 30 is facilitated at the portions where the retroreflective elements 24 and the particles 30 are in contact with each other. Thus, the retroreflectivity of the retroreflective sheet 100 can be further improved.

Although a preferred embodiment of the present invention is described above as an example, the present invention is not limited to this.

For example, in the above-described embodiment, an example is described in which the surface protective layer 10 is provided. However, the surface protective layer 10 is not an essential component.

Furthermore, in the above-described embodiment, an example is described in which the adhesive layer 50 is provided. However, the adhesive layer 50 is not an essential component. For example, when the back face layer 40 is made of an adhesive, the retroreflective sheet can be attached to an object even if the adhesive layer 50 is not provided. Thus, the retroreflective sheet can have a simple layer structure, and the production cost of the retroreflective sheet can be prevented from being high.

In the above-described embodiment, an example is described in which the bonding portion 42 is formed to have a gird shape in plan view. Specifically, in the configuration described as an example, the capsule portions 46 surrounded by the bonding portion 42 have a rectangular shape. However, the present invention is not limited to this configuration, and the shape of the capsule portions 46 surrounded by the bonding portion 42 in plan view may be any shape such as a circle, an ellipse, or a polygon other than a rectangle.

Figure 4:
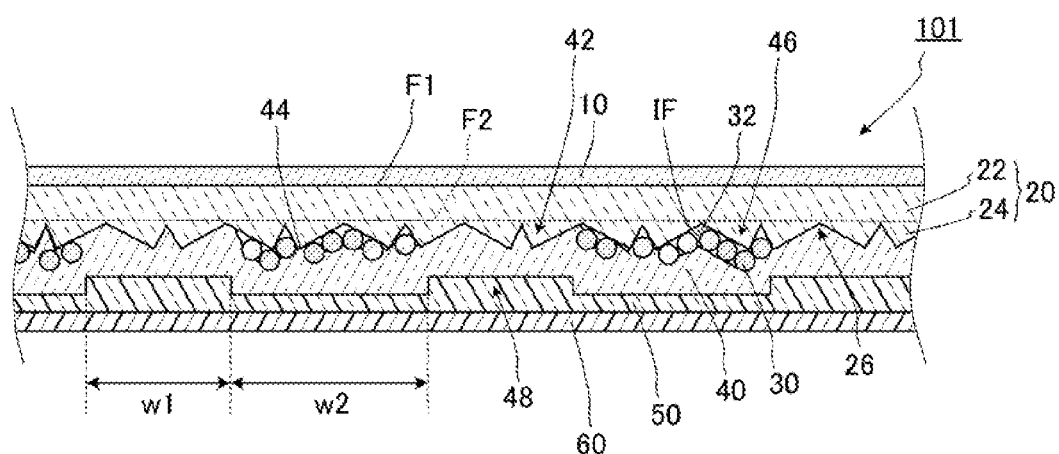
FIG. 4 is a cross-sectional view of a retroreflective sheet according to a modification of the present invention as viewed in a direction that is same as that for FIG. 2.

Furthermore, in the above-described embodiment, an example is described in which the plurality of particles 30 is disposed in the plurality of capsule portions 46 and the bonding portion 42. However, the present invention is not limited to this configuration. FIG. 4 is a cross-sectional view of a retroreflective sheet according to a modification of the present invention as viewed in a direction that is same as that for FIG. 2. In the retroreflective sheet 101 illustrated in FIG. 4, the plurality of particles 30 is disposed in the plurality of capsule portions 46 and not disposed in the bonding portion 42. With the plurality of particles 30 disposed in the capsule portions 46, the voids 32 are formed between the retroreflective elements 24 and the particles 30 in the capsule portions 46, whereby a decrease in the retroreflectivity is less likely to be compromised. With no particles 30 disposed in the bonding portion 42, the bonding area of the retroreflective elements 24 and the back face layer 40 increases, whereby increased bonding strength between the retroreflective elements 24 and the back face layer 40 can be achieved.

As described above, the present invention provides a retroreflective sheet in which a decrease in the retroreflectivity is less likely to be compromised even when the pressure in the thickness direction is applied, and can be used for fields of car license plate, advertisement, and the like.

REFERENCE SIGNS LIST 10 surface protective layer
20 retroreflective layer
24 retroreflective elements
26 valley
30 particle
32 void
40 back face layer
42 bonding portion
44 partial bonding portion
46 capsule portion
50 adhesive layer
60 release layer
100, 101 retroreflective sheet

The invention claimed is:

1. A retroreflective sheet comprising:
a retroreflective layer including a plurality of retroreflective elements on one surface;
a back face layer provided to face the surface of the retroreflective layer on the side of retroreflective elements, said back face layer including a bonding portion bonded to the retroreflective elements; and
a plurality of particles disposed between the retroreflective elements and the back face layer, said particles being in contact with the retroreflective elements and the back face layer, wherein
the bonding portion is continuously formed to surround a plurality of capsule portions in plan view, and
voids are formed between the retroreflective elements and the back face layer in the plurality of capsule portions.

2. The retroreflective sheet according to claim 1, wherein the plurality of particles is disposed in the bonding portion.

3. The retroreflective sheet according to claim 1, wherein the plurality of particles is not disposed in the bonding portion.

4. The retroreflective sheet according to claim 1, wherein in the plurality of capsule portions, a part of the back face layer and a part of the retroreflective elements are bonded to each other.

5. The retroreflective sheet according to claim 4, wherein in plan view, a width w1 of the bonding portion is 1000 μm or less, and w1/w2 is 0.7 to 1.4 where w2 is a width of the capsule portions.

6. The retroreflective sheet according to claim 5, wherein the plurality of particles is colored with a color similar to a color of the back face layer.

7. The retroreflective sheet according to claim 6, wherein a refractive index of the plurality of particles is less than a refractive index of the retroreflective elements.

8. The retroreflective sheet according to claim 7, wherein an average particle diameter da of the plurality of particles is equal or greater than a height h of the retroreflective elements.

9. The retroreflective sheet according to claim 8, wherein an average particle diameter da of the plurality of particles is less than a height h of the retroreflective elements.

10. The retroreflective sheet according to claim 9, wherein a ratio da/h is 0.40 to 1.25 where da is the average particle diameter of the plurality of particles and h is the height of the retroreflective elements.

11. The retroreflective sheet according to claim 10, wherein np/nv is 0.50 to 5.00 where np is a number of the plurality of particles and nv is a number of valleys formed between the adjacent retroreflective elements.

12. The retroreflective sheet according to claim 11, wherein the plurality of particles is spherical.

13. The retroreflective sheet according to claim 1, wherein in plan view, a width w1 of the bonding portion is 1000 μm or less, and w1/w2 is 0.7 to 1.4 where w2 is a width of the capsule portions.

14. The retroreflective sheet according to claim 1, wherein the plurality of particles is colored with a color similar to a color of the back face layer.

15. The retroreflective sheet according to claim 1, wherein a refractive index of the plurality of particles is less than a refractive index of the retroreflective elements.

16. The retroreflective sheet according to claim 1, wherein an average particle diameter da of the plurality of particles is equal or greater than a height h of the retroreflective elements.

17. The retroreflective sheet according to claim 1, wherein an average particle diameter da of the plurality of particles is less than a height h of the retroreflective elements.

18. The retroreflective sheet according to claim 1, wherein da/h is 0.40 to 1.25 where da is the average particle diameter of the plurality of particles and h is the height of the retroreflective elements.

19. The retroreflective sheet according to claim 1, wherein np/nv is 0.50 to 5.00 where np is a number of the plurality of particles and nv is a number of valleys formed between the adjacent retroreflective elements.

20. The retroreflective sheet according to claim 1, wherein the plurality of particles is spherical.

21. The retroreflective sheet according to claim 1, wherein the retroreflective elements comprise a reflective surface configured to retroreflect incident light, and
at least some of the particles are disposed in contact with a portion of the reflective surfaces other than an edge portion.

* * * * *